(12) United States Patent
Sayed et al.

(10) Patent No.: US 11,805,131 B2
(45) Date of Patent: *Oct. 31, 2023

(54) METHODS AND SYSTEMS FOR VIRTUAL FILE STORAGE AND ENCRYPTION

(71) Applicant: KeepItSafe (Ireland) Limited, Dublin (IE)

(72) Inventors: Saheeq Sayed, London (GB); Karolina Kondzielewska, London (GB); John Eikenberry, London (GB)

(73) Assignee: KeepItSafe (Ireland) Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,267

(22) Filed: Jan. 31, 2022

(65) Prior Publication Data
US 2022/0232012 A1    Jul. 21, 2022

Related U.S. Application Data

(63) Continuation of application No. 16/691,464, filed on Nov. 21, 2019, now Pat. No. 11,240,251, which is a (Continued)

(51) Int. Cl.
*H04L 9/40* (2022.01)
*G06F 21/60* (2013.01)
*G06F 21/62* (2013.01)

(52) U.S. Cl.
CPC .......... *H04L 63/105* (2013.01); *G06F 21/602* (2013.01); *G06F 21/6245* (2013.01); *H04L 63/0428* (2013.01)

(58) Field of Classification Search
CPC . H04L 63/105; H04L 63/0428; G06F 21/602; G06F 21/6245
See application file for complete search history.

(56) References Cited

U.S. PATENT DOCUMENTS 6,289,450 B1    9/2001  Pensak et al.
6,978,367 B1   12/2005  Hind et al.
(Continued)

FOREIGN PATENT DOCUMENTS

AU    2016210661 A1    8/2016
CA     2941439 A1      8/2016
(Continued)

OTHER PUBLICATIONS

Examination Report for New Zealand Application No. 770092 dated Feb. 2, 2022, 5 pages.
(Continued)

*Primary Examiner* — Yonas A Bayou
(74) *Attorney, Agent, or Firm* — Aikin & Gallant, LLP

(57) ABSTRACT

The present invention discloses an intelligent cloud server for cloud storage information management and encryption. In some embodiments, the intelligent cloud server can save and store documents without the need of first saving them in a local drive for upload. Upon storage, the document can be scanned and classified in a security level according to pre-determined settings and parameters. In some embodiments, depending on the classification, the system can encrypt portions of the document in order to facilitate the sharing and access of information in a secure way. Encryption keys and access to the encrypted portions are only provided upon authentication of the user, network, and/or need, according to corresponding protocols for the information.

20 Claims, 6 Drawing Sheets

Related U.S. Application Data continuation of application No. 15/548,076, filed as application No. PCT/GB2016/050317 on Feb. 10, 2016, now Pat. No. 10,516,674.

(56) References Cited

U.S. PATENT DOCUMENTS

| | | | |
|---|---|---|---|
| 7,010,681 B1 | 3/2006 | Fletcher et al. | |
| 7,996,374 B1 | 8/2011 | Jones et al. | |
| 8,132,258 B1 | 3/2012 | Jensen et al. | |
| 8,402,544 B1 | 3/2013 | Soubramanien et al. | |
| 8,522,050 B1* | 8/2013 | Wakerley | H04L 63/0428 713/193 |
| 8,561,127 B1* | 10/2013 | Agrawal | H04L 63/105 726/13 |
| 8,578,499 B1 | 11/2013 | Zhu et al. | |
| 8,838,992 B1 | 9/2014 | Zhu et al. | |
| 9,251,545 B2* | 2/2016 | Nastacio | H04L 67/02 |
| 9,928,377 B2* | 3/2018 | Narayanaswamy | H04L 9/0861 |
| 9,940,469 B2* | 4/2018 | Li | G06Q 10/10 |
| 10,061,899 B2* | 8/2018 | Miller | G16H 40/40 |
| 10,157,339 B2* | 12/2018 | Hill | H04L 9/14 |
| 10,243,946 B2* | 3/2019 | Sridhar | H04L 63/0815 |
| 10,255,458 B2* | 4/2019 | Aunger | H04L 63/083 |
| 2003/0105719 A1 | 6/2003 | Berger et al. | |
| 2004/0181679 A1 | 9/2004 | Dettinger et al. | |
| 2005/0005017 A1 | 1/2005 | Ptacek et al. | |
| 2005/0138109 A1 | 6/2005 | Redlich et al. | |
| 2005/0216956 A1 | 9/2005 | Orr et al. | |
| 2007/0044734 A1 | 3/2007 | Maloney et al. | |
| 2008/0021834 A1 | 1/2008 | Holla et al. | |
| 2013/0006865 A1* | 1/2013 | Spates | H04L 9/083 705/50 |
| 2016/0014148 A1 | 1/2016 | Lee et al. | |
| 2016/0087946 A1* | 3/2016 | Yang | H04L 63/0428 713/171 |
| 2018/0113747 A1* | 4/2018 | Resch | G06F 11/1076 |

FOREIGN PATENT DOCUMENTS

| | | |
|---|---|---|
| EP | 3103054 A1 | 12/2016 |
| GB | 2535183 B | 2/2017 |
| GB | 2545818 B | 11/2017 |
| NZ | 722853 | 8/2016 |
| WO | 2010/098722 A1 | 9/2010 |
| WO | 2013/079907 A1 | 6/2013 |
| WO | 2016/128746 A1 | 8/2016 |

OTHER PUBLICATIONS

Examiner's Report for Canadian Application No. 2,941,439 dated Feb. 8, 2022, 4 pages.
Examination Report for Australian Application No. 2021212070 dated Sep. 16, 2022, 2 pages.
Australian Examination Report for Application No. 2016210661 dated Apr. 17, 2020, 3 pages.
Examination Report for Australian Application No. 2016210661 dated Sep. 23, 2020, 3 pages.
International Preliminary Report on Patentability received from PCT Application No. PCT/GB2016/050317, dated Aug. 24, 2017.
International Search Report and Written Opinion received freom PCT Application No. PCT/GB2016/050317, dated Jun. 1, 2016.
IPO Great Britain—Combined Search and Examination Report for GB Patent Application No. 1700398.9, dated Apr. 20, 2017, 4 pages.
IPO Great Britain—Notification of Grant received for GB Patent Application No. 1502262.7, dated Jan. 17, 2017, 2 pages.
New Zealand Examination Report for Application No. 722853 dated Mar. 6, 2020, 4 pages.
Office Action received for European Patent Application No. 16704899.0, dated Jun. 21, 2018, 8 pages.
Office Action received for GB Patent Application No. 1700398.9, dated Oct. 24, 2017, 2 pages.
United Kingdom Search Report received from UK Application No. 1502262.7, dated Sep. 9, 2015.

* cited by examiner

METHODS AND SYSTEMS FOR VIRTUAL FILE STORAGE AND ENCRYPTION

This application is a continuation of U.S. application Ser. No. 16/691,464 filed Nov. 21, 2019, which is a continuation of U.S. application Ser. No. 15/548,076, filed Aug. 1, 2017, now U.S. Pat. No. 10,516,674, which is a U.S. National Phase Application of International Application No. PCT/GB2016/050317 filed Feb. 10, 2016, which claims the benefit of UK Patent Application No. GB1502262.7 filed Feb. 11, 2015.

FIELD

This invention describes methods and systems for virtual file storage and encryption, and more specifically, cloud storage enabled for document sharing and managing of sensitive information intelligently.

BACKGROUND

Information technology continues to rapidly evolve to meet new demands and challenges presented. Recently in this field, cloud storage and file management services were made available to individuals and organizations in order to allow users to access and link information from various locations and devices. Typically, users buy or lease storage capacity from a hosting company that is responsible for keeping the data available, secure, accessible, and the physical environment protected and running. The systems implemented and maintained by hosting companies often include several servers (often in different locations and with redundancy) that can be accessed through a co-located cloud computer service, a web service application programming interface or applications, such as, a cloud storage gateway or Web-based content management system.

Prior to the implementation of cloud based systems, the storage, transmission and dispersion of data generally included and was limited to the use of removable media for manual sharing, centralized servers on computer networks, e-mailing and/or hyperlinked documents, and the use of distributed peer-to-peer networking. Now with cloud based storage systems, file syncing and sharing services can allow users to create special folders on each of their devices (e.g., computers, mobile devices, tablets, etc.) and the hosting company's systems can synchronize these folders so that it appears to be the same folder regardless of which device is used to view it, typically through a website or an application. Furthermore, some websites may be secure websites where additional authentication is needed for a user to access the folder/data.

Although these systems have improved information management and facilitated the sharing and/or transmission of data, various improvements are desired for the storage and management of sensitive data, for example, for medium and large enterprises, which often handle customer's confidential information. For example:

There is a need to prevent having to save the document file in local designated folders in each of the user's devices.

There is a need for a system that helps prevent the interception, unintended access and misuse of confidential information.

There is a need for a cloud based system that allows fast and secure information sharing within an enterprise and with additional authorized parties.

In order to overcome the at least the aforementioned limitations in order to improve storage and management of data, improved systems/methods are highly desired.

SUMMARY

The foregoing needs are met, to a great extent, by the present invention, wherein in one aspect a cloud based file management system for storing and managing documents is disclosed. The cloud based file management system can be configured to allow a user to create and save a document file in a cloud based server. Additionally, the sharing and/or transmission of the document file is done by taking into account user's information and/or pre-programmed settings for improved security, speed, and reliability.

According to some aspects of the disclosure, a method for managing a computer readable document file is disclosed. In particular, the method including: storing and accessing operational information relating to operations and structure of a business enterprise for an access authorization to a computer readable document file; saving the computer readable document file on a digital media storage database forming part of a host's cloud storage system; determining at least a first access permission level and a second access permission level for the computer readable document file; assigning individuals who have been granted access to the computer readable document file at least one of the first permission level and the second permission level by reference to the operational information; identifying a first type of sensitive information in the computer readable document file; matching the first type of sensitive information in the file with at least one of the at least first access permission level and the second access permission level; encrypting the identified first type of sensitive information; and providing an access key configured to provide access to the individuals assigned with the one of the at least first access permission level and the second access permission level corresponding to the first type of sensitive information; wherein the identifying of the first type of sensitive information in the computer readable document file comprises scanning the computer readable document file for predefined keywords.

In additional aspects of the disclosure, a cloud based file management system is disclosed. The cloud based filed management system including an intelligent cloud server including a controller, the controller comprising a computer processor in digital communication with a digital media storage device and wherein the digital media storage device stores software code. In addition, a transmitter can be in logical communication with the intelligent cloud server and also in logical communication with a communication network. The software being executable upon demand and operative with the processor to: store and access operational information relating to operations and structure of a business enterprise for an access authorization to a computer readable document file; save the computer readable document file on a digital media storage database forming part of a host's cloud storage system; determine at least a first access permission level and a second access permission level for a computer readable document file; assign individuals who have been granted access to the computer readable document file at least one of the first permission level and the second permission level by reference to the operational information; identify a first type of sensitive information in the computer readable document file; match the first type of sensitive information in the file with one of the at least first access permission level and the second access permission level; encrypt the identified first type of sensitive information; and provide an access key configured to provide access to the individuals assigned with the one of the at least first access permission level and the second access permission level corresponding to the first type of sensitive information; wherein the identifying of the first type of sensitive information in the computer readable document file comprises scanning the computer readable document file for predefined keywords.

In yet additional aspects of the disclosure, a second type of sensitive information in the computer readable document file can be identified. The second type of sensitive information in the computer readable document file can be matched with a permission level not matched for the first type of sensitive information and encrypted. According on the user, a second access key for the encrypted second type of sensitive information to individuals assigned with the matched access level for the second type of sensitive information can be provided.

In some embodiments, encrypting includes redacting sensitive information to prevent individuals who have been granted access to the computer readable document file but without the access key from viewing the encrypted portions. For the encryption, a document file may be segmented according to the security levels, the users for which it is intended access to the document file, and/or the information contained. In addition or alternatively, duplication of data that excludes the identified sensitive information into a new document can occur.

According to some aspects, the identifying of the first type of sensitive information in the computer readable document file can be done via both a pattern recognition algorithm and keyword identification.

According to some aspects, upon provision of an access key and/or access to a document, actions can be recorded and may include but are not limited to one or more of access time and date, duration of document access, device's internet protocol address, device's serial number, network location, and user.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other methods and systems for carrying out the several purposes of the invention. It is important, therefore, that the claims be regarded as including such equivalent constructions insofar as they do not depart from the scope of the invention.

BRIEF DESCRIPTION OF THE DRAWINGS

The foregoing and other features and advantages of the invention will be apparent from the following, more particular description of exemplary embodiments of the invention, as illustrated in the accompanying drawings.

DETAILED DESCRIPTION

Figure 1:
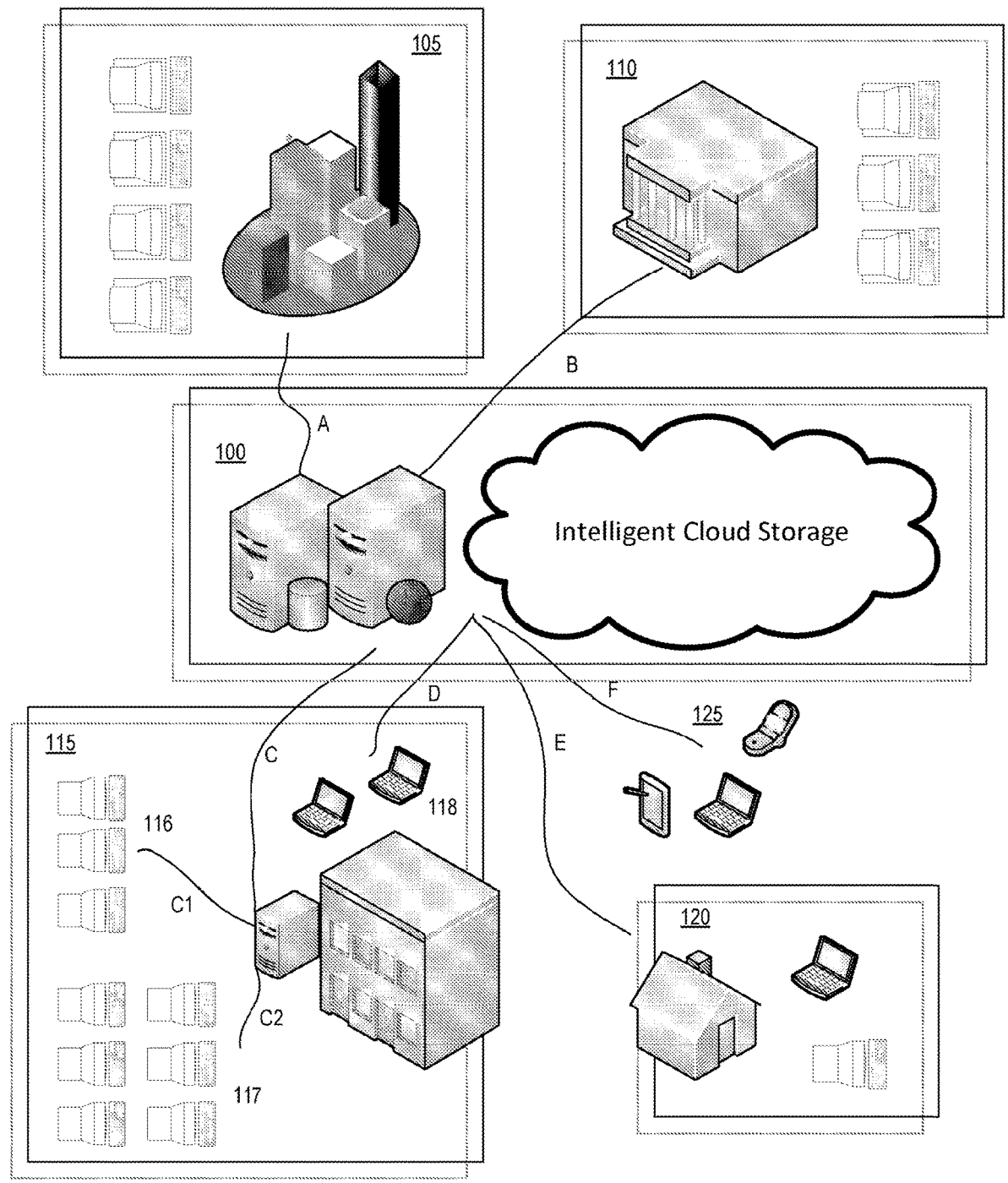
FIG. 1 is a schematic diagram showing an enterprise's exemplary cloud based network in accordance with aspects of the present disclosure.

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Various aspects of the cloud based document storage and management systems and methods disclosed may be illustrated with reference to one or more exemplary embodiments. As used herein, the term "exemplary" means "serving as an example, instance, or illustration," and should not necessarily be construed as preferred or advantageous over other embodiments disclosed herein.

Glossary

In this description and claims directed to the disclosed invention, various terms may be used for which the following definitions will apply:

"Business enterprise" as referred to herein can include any business and government entity which may be structured and operate by business units and in different locations. Some enterprises can also allow members to work remotely from home.

"Intelligent cloud server" as referred to herein can include one or more servers, each and/or together, executing software configured to be used and managed to perform data storage and management tasks described throughout the disclosure. According to some aspects, this operating system essentially can create a managed and scalable storage system implementing multiple independent computing devices which can be allocated and used more efficiently and securely. More specifically, the intelligent cloud server can be used to manage sensitive confidential information by allowing users to view documents containing the confidential information along with information required for an assigned task by censoring what is made available according to predetermined factors and conditions.

With the evolution of business structures and the increase of distributed businesses and business groups, it is important for business enterprises to store and manage their information in ways that allow customized access types and protect the unintended use of sensitive confidential information, both without detrimentally affecting or creating significant barriers for its use in confirming everyday practices. For this, depending on its size, a business enterprise may integrate its own network with a cloud service or rely solely on a hosted document storage and management service. Either way, it can be of upmost importance for the host to protect and safely manage sensitive confidential information of the business. However, because a business enterprise often manages information relating to the business, the types of information and its sensitive confidential nature differ greatly from business to business making access and transfer regulation of information difficult for the host. According to aspects of the present disclosure, a host can implement information about the business structure and inputs from an account administrator to securely store and manage a business enterprise's data.

Referring now to FIG. 1, a schematic diagram showing an enterprise's exemplary cloud based network is depicted. In particular, the network showing a typical business structure that can implement aspects of the disclosure to enable collaboration between business groups and/or entities with the secure access and transfer of information. An intelligent cloud data center 100 is managed and maintained by a host. The intelligent cloud data center 100 is preferably a distributed system designed to provide storage redundancy and improve transfer speeds for improved cloud based collaboration. The improved cloud based collaboration resulting at least in part due to the control of information to enable mainstreaming access and transfer of data as needed. For example, in different fields and job functions, an employee may need only non-confidential information found in a document containing confidential data. The company, as it is often required, will impose access restrictions and time consuming procedures for obtaining the document. Most procedures will not allow the uploading of the document to a shared drive because of it and the employee will be stuck on his/her task until the procedure is completed. After it is completed, although risk is minimized, often the employee also obtains access to the additional information he/she did not need for completing the task exposing the company's confidential information. Generally this information may be customers' bank/financial records, medical records, human resources records, and the such. As further explained in other parts of this disclosure, by filtering and controlling access to the information in the intelligent cloud data center 100 secure access and transfer of information can be streamlined.

The intelligent cloud data center 100 can include several integrated or distributed cloud service, cloud infrastructure, cloud storage, and cloud platform elements to enable infrastructure, a platform, software, and/or unified communications as a service. Accordingly, it can be deployed as a private cloud, public cloud, or a hybrid cloud to allow controlled connectivity between identified entities and limited connectivity between unidentified entities. Identified entities may include a server or individual devices in a business enterprises' headquarters 105, a partner or affiliates site 110, a branch office 115, a remote work location 120, and company issued devices 125. As depicted at A-F, communication between the several identified entities can be set up to be indirect communication that is controlled by the intelligent cloud data center 100. The intelligent cloud data center 100 thus can control the information differently for each of the entities according to the aspects disclosed. In some embodiments, the information can be further controlled by business group in a particular entity. For example, branch location 115 may be for example an R&D facility that includes research laboratory computers 118, an accounting and procurement department 116, and a human resources department 117. Financial information then can be isolated from isolated from technical data and operational records. For example, selected information may further be internally controlled by an internal network including communication paths C1 and C2.

With devices issued by the company but in unknown networks, e.g., wireless devices 125 in a public network or a computer in an employee's home network 120, although an entity is identified, additional restrictions to ensure risk of information leakage may be implemented. Unidentified networks may also be in communication. These may be individual customers, for example, ordering a product and/or service from the company, submitting a customer service complaint, etc.

Figure 2:
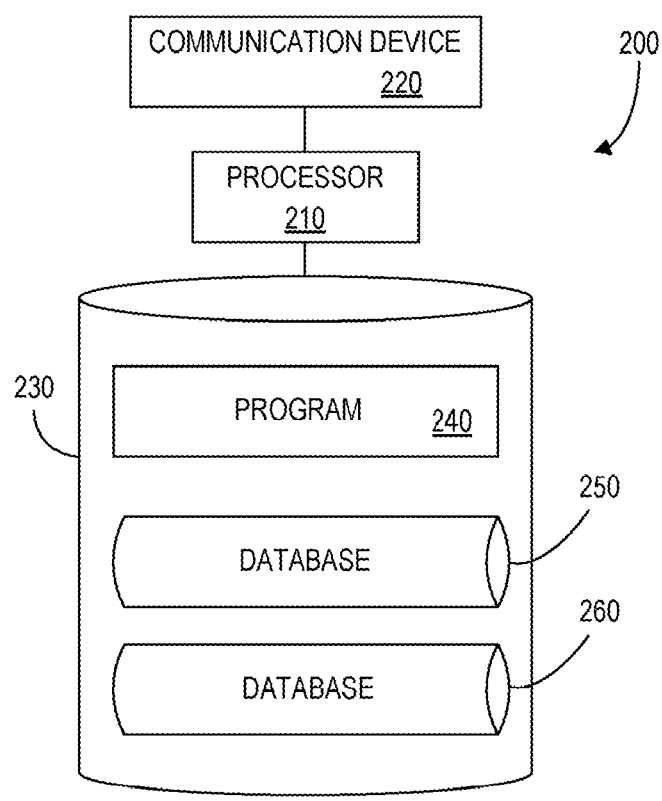
FIG. 2 is a schematic diagram of a processor that may be used to implement some aspects of the present disclosure.

Referring now to FIG. 2 is a schematic diagram of a processor that may be used to implement some aspects of the present disclosure is illustrated. The controller 200 forming part of the intelligent cloud data center (shown in FIG. 1 at 100) can include one or more processors 210, which may include one or more processor components coupled to a communication device 220. In some embodiments, a controller 200 can be used to transmit data according to a classification of the data and the identification of the entity receiving and/or sending the information.

The processors 210 can be coupled to a communication device configured to communicate via a communication channel. The communication device may be used to electronically communicate with networks and/or individual devices, for example, an internal network. The communication device 220 may also be used to communicate, for example, with one or more controller apparatus or programming/interface device components.

The processor 210 is also in communication with a storage device 230. The storage device 230 may comprise any appropriate information storage device, including combinations of magnetic storage devices, optical storage devices, and/or semiconductor memory devices such as Random Access Memory (RAM) devices and Read Only Memory (ROM) devices.

The storage device 230 can store a program 240 for controlling the processor 210. The processor 210 performs instructions of a software program 240, and thereby operates in accordance with the present invention. For example, the processor 210 may receive information descriptive of an identified entity, business group, project, keyword settings, pattern recognition settings, and the like. The storage device 230 can also store other pre-determined network security data in one or more databases 250 and 260. The database may include, for example, communication protocols, parameters and thresholds, keyword settings, pattern recognition settings, and controlling algorithms for the control of information as well as data and/or feedback that can result from their action. In some embodiments, that data may be ultimately communicated to/from an external device.

Figure 3:
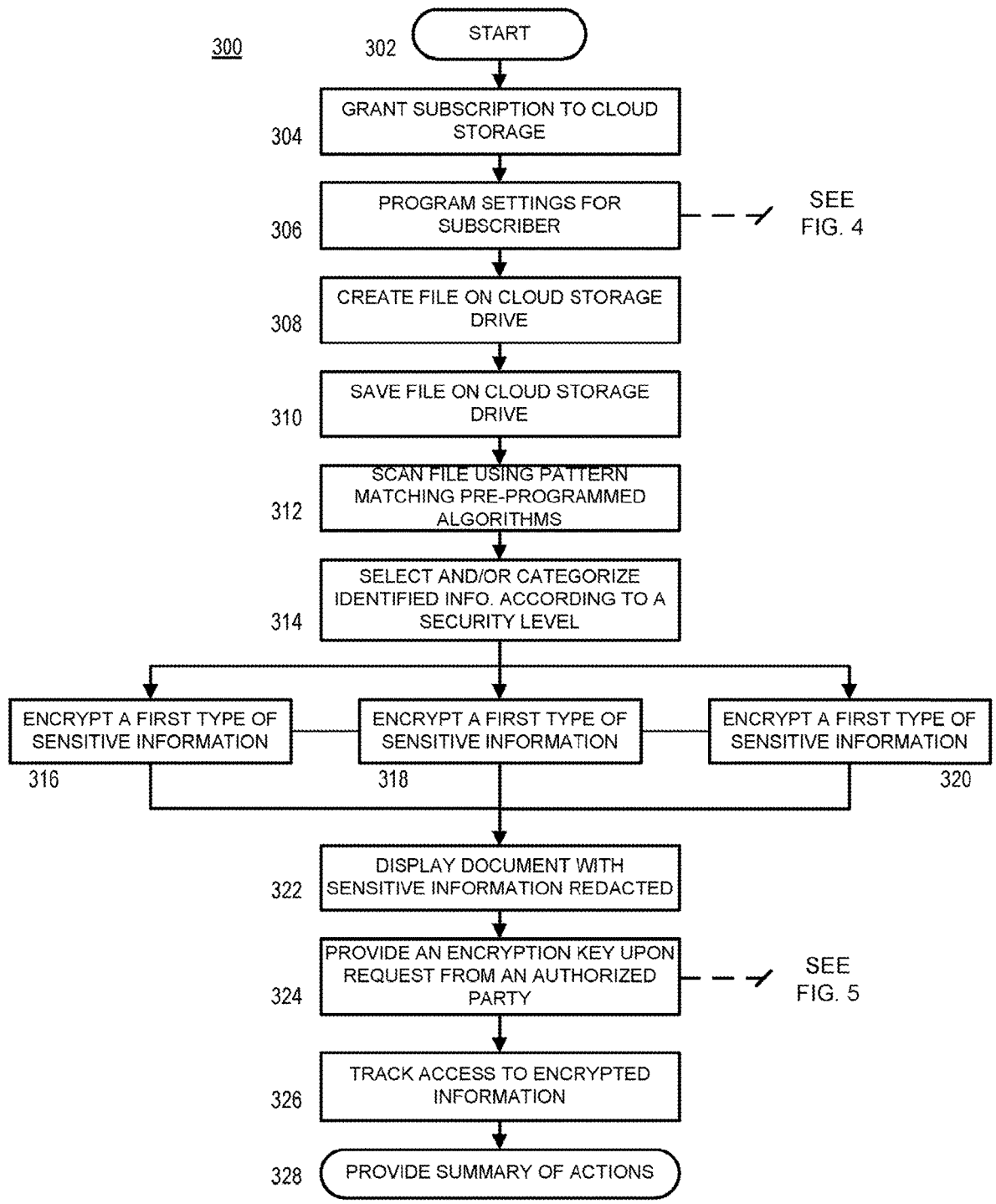
FIG. 3 is a flowchart depicting exemplary method steps for the management and encryption of information in accordance with aspects of the present disclosure.

Referring now to FIG. 3, a flowchart 300 depicting exemplary method steps for the management and encryption of information in accordance with aspects of the present disclosure is depicted. In particular, it discloses ways how using user specific settings to identify encryption parameters, a document file can be shared while protecting sensitive information in an expedited improved manner. Beginning at step 302, a user can sign up, activate, and/or access a cloud storage service subscription. According to some aspects, the user may be the account manager, such as an information technology professional, the chief information officer, and the such, working for a business enterprise.

At step 304, the service provider grants access to the user, allowing the user to input preferences and program settings for the subscriber at step 306. Once the subscription is set up, in some embodiments, at steps 308 and 310, a file can be created and/or saved on a memory of the cloud storage service provider. By saving the file directly on a database of the service provider, the duplication of information and the need to save it locally first and then upload it for sharing can be eliminated. In addition to expedited sharing, the cloud storage can act as a briefcase such that a person can access the file from several devices and locations according to the programmed settings. The file may be saved directly in the service hosts' system by a) Virtual File System (VFS)—the user would be able to use a VFS to upload data to the cloud. The VFS is a virtual drive mounted on the user's computer. The VFS would not take up any space on the user's computer, instead, it would act as a portal between the user's computer and the cloud storage. The user would place a file into the VFS and the file would begin to upload to the cloud. The VFS can be used for upload and download of data. It allows for secure transfer as it would never store data on the user's local computer. The VFS can be "un-mounted" meaning all data in the VFS would no longer be accessible. The VFS is mounted in an encrypted state meaning no other software can read the content stored within the VFS, b) use of a small program ("app") installed within a browser (or other similar document viewer) or running on remote servers that would copy the file directly from the remote server to the cloud storage, bypassing the user's local system, or c) a program running within the Cloud Storage service that can remotely access the source file (via secure channels like https, ftps, or similar) and transfer the file directly into the Cloud Storage.

At step 312, a pattern matching pre-programmed algorithm can be used to scan the document file and identify sensitive and/or confidential information. Some examples include: personal information, such as a national identification number, national insurance number, U.S. social security number, bank account information, personal names, health history, etc. The pre-programmed algorithms may be set to operate by recognition of number sequences and/or keyword matching. For example:

Bank Name . . . [xxxxxxxx] (8 digit routing number) followed by [xxxxxxxxxx] (9 digit account number).

[xxx]-[xx]-[xxxx] (3 digit number~2 digit number~4 digit number=U.S. social security number).

User selected areas—The user would be able to select the areas of a document they would like "sanitized". Once the user marks a specific area, it will only be visible to people on a pre-defined permissions list; any user not on the list would not be able to see the sanitized information as they would not know if it even existed. All the sanitized information would be encrypted.

Keyword Sanitization Algorithm—The user could also use key words to sanitize a document, an algorithm would look for keywords and sanitize a document based on the weight of the words, the user would define words and give them ratings, the algorithm would then scan the document and sanitize any areas with the pre-defined keywords.

Mark-Up Syntax Sanitization—Users could also use a mark-up syntax to mark sections of the document. In the example below anything within the "{access}" tags would be sanitized and would only be able to be viewed by the pre-approved viewers. Example: {access="saheeq.sayed@livedrive.com", "john.eikenberry@livedrive.com"} This is some top secret information about what our next BIG project is going to be. {access}

Keyword and Context Comparison—a source document (or set of documents) could be identified as correctly sanitized, the sanitized passages would compare against the current document and any areas that have the same keywords (and/or context) could be automatically marked to be sanitized following the rules from the source document.

Recognition of employee's first and last names which are recorded in a database.

At step 314, the identified information can be selected and/or categorized according to a corresponding pre-programmed security level. From this, at steps 316/318/320, the information may be encrypted depending on its classification and the security level requirements. The encryption of a document may include breaking the document into blocks, duplicating non-classified information, and/or redacting of the information out of a document. Depending on the encryption method implemented, at step 322, the document may be shared by means of displayed or transferred to an authorized party. If authorized and needed to conform to a security classification, an encryption key may be separately sent out to an user at step 324.

In some embodiments, at step 326, an action (e.g., transmission or access) relating to highly confidential/sensitive information is recorded to increase control and accountability of the recipients. At step 328, a summary of the recordings can be provided to an administrator or analyzed, for example, weekly, monthly, daily, quarterly, etc., to establish patterns and detect unusual requests or activity in the organization.

Figure 4:
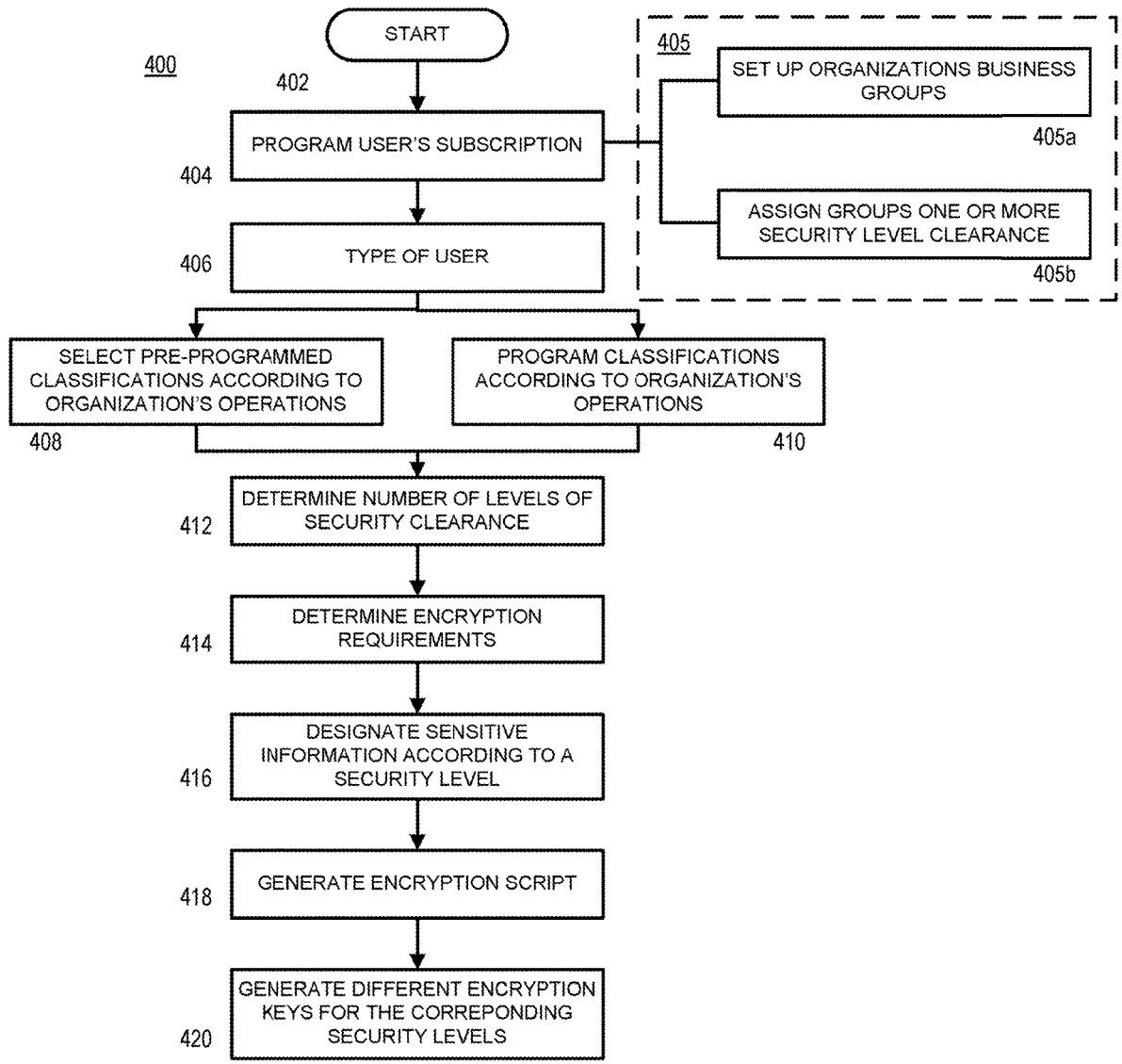
FIG. 4 is a flowchart depicting exemplary method steps for the programming of a subscriber's settings in accordance with aspects of the present disclosure.

Referring now to FIG. 4, a flowchart 400 depicting exemplary method steps for the programming of a subscriber's settings in accordance with aspects of the present disclosure is depicted. In particular, settings for a medium/large size business enterprise engaging in research and/or handling sensitive information. Beginning at step 402, an administrator for the business enterprise can begin, for example, by initiating a subscription or updating an existing subscription account. At step 404, a portal can be provided for the administrator to program settings 405 for the subscription as part of an initial set up, maintenance and/or updating. In the event of a new account being set up, for example, at step 405*a*, the administrator can enter information about the site locations, number and identifier for approved devices, employee numbers and residence information, type of business, business groups, affiliate parties, and the such. At step 405*b*, for a given category a security level, permission level, and/or access level, can be assigned.

At step 406, protocols corresponding to the different types of users can be set up according to the job duties of the users, business groups, and/or assignments. At steps 408 or 410 respectively, selection of pre-programmed classifications or new programing of classifications can take place. At step 412, the classifications can then be arranged in a manageable unique number of levels of security clearance. Preferably for each of these levels, at step 414, encryptions requirements are determined and a separate encryption protocol is assigned to the respective levels.

At step 416, information that may be identified according to a preprogrammed sequence and/or keyword matching algorithm can be matched to a security level. A script is then generated, at step 418, such that when dealing with a particular security level, a set of actions take place for access/transmission authentication. At step 420, encryption keys that meet legal or business practice security requirements/guidelines are then generated for authorized users to gain access to the information.

Figure 5:
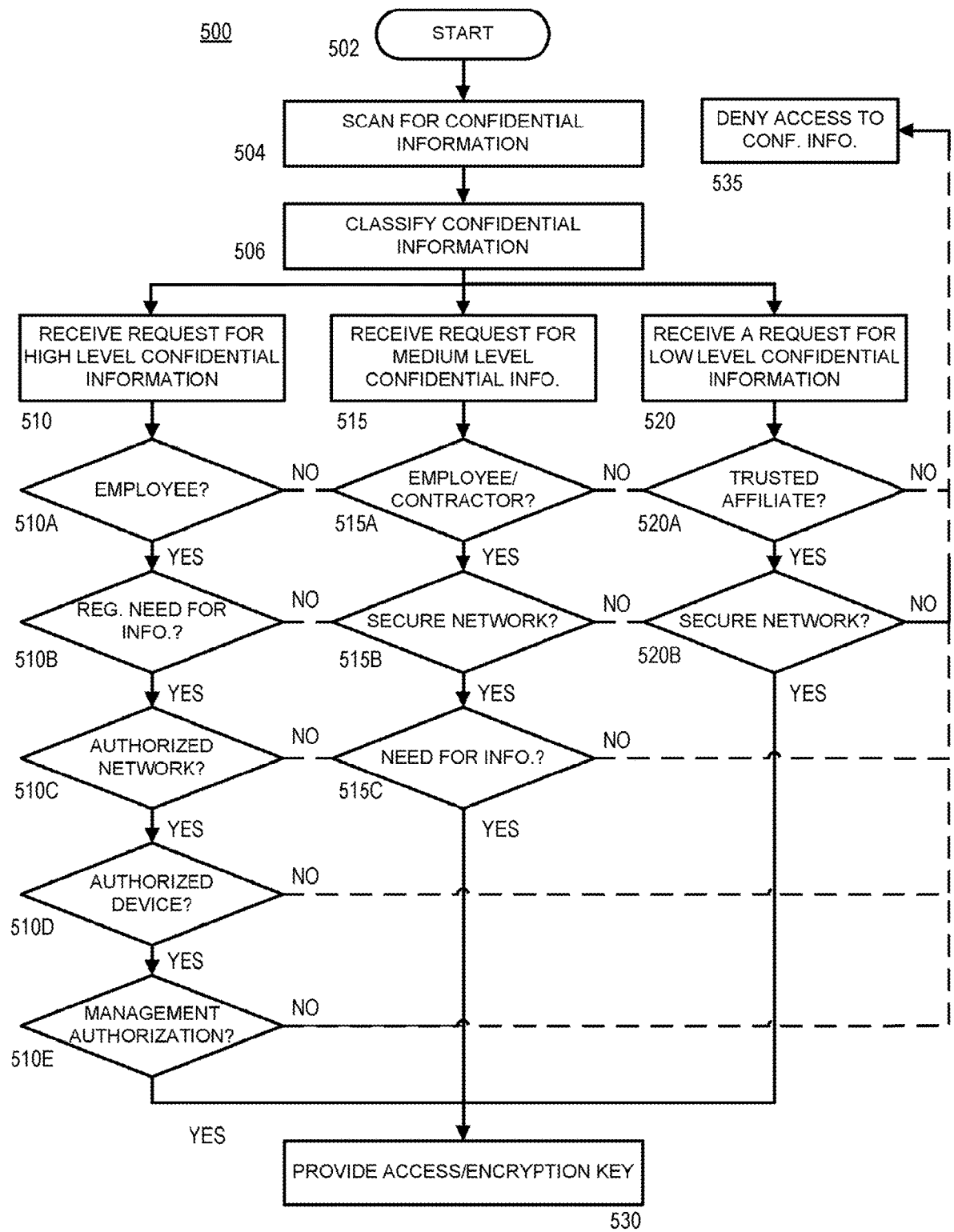
FIG. 5 is a flowchart depicting exemplary method steps for the providing of access to sensitive information in a document file in accordance with aspects of the present disclosure.

Referring now to FIG. 5, a flowchart 500 depicting exemplary method steps for the providing of access to sensitive information in a document file in accordance with aspects of the present disclosure is depicted. In particular, exemplary protocols for high, medium, and low levels of information confidentiality that could take place according to the preprogrammed settings. Beginning at step 502, the creation and/or upload of a new document can take place. Once it is on the host's system, at step 504, a scan may take place to signal whether the document has any confidential/sensitive information. At step 506, the confidential information is the classified and stored according to aspects of the disclosure.

Once a request is made, at steps 510, 515, or 520, a request for access or transmission of a document is received by the host's system.

At step 510, a request for a document that is classified as having high level confidential information is received. At step 510A, the system will determine whether the request was received by an employee as opposed to a contractor, affiliate, or an unidentified party. Upon verification of active employment, at step 510B, the system can see if the particular employee belongs to a business group that regularly uses information contained within the document or if the user has a need for it according to a business objective. At steps 510C and 510D respectively, the system will check to ensure the information is requested from a secure network and authorized device. At step 510E, the system can request management authorization for access to the document at the time and from the place requested. Once it is determined that a threshold is met, access and/or an encryption key can be provided to the user at step 530. If the threshold is not met, access will be denied at step 535.

At step 515, the request may be for a document that is classified as having medium confidential information. Upon receipt, at steps 515A, 515B and 515C respectively, the system may verify lower threshold requirements, such as, whether the requester is either an employee or a contractor, he/she is using a secure network, and there is a need for the information request. Similarly, the appropriate encryption key can be requested at step 530 if the threshold is met or denied at step 535 when it does not meet it.

At step 520, the request may be for a document that is classified as having low level confidential information. Upon this request, for example, only at steps 520A and 520B respectively, may the system then be programmed to verify whether the request comes from an employee/contractor/affiliate and a secure network is being used to provide access and/or the respective encryption key at step 530.

Figure 6:
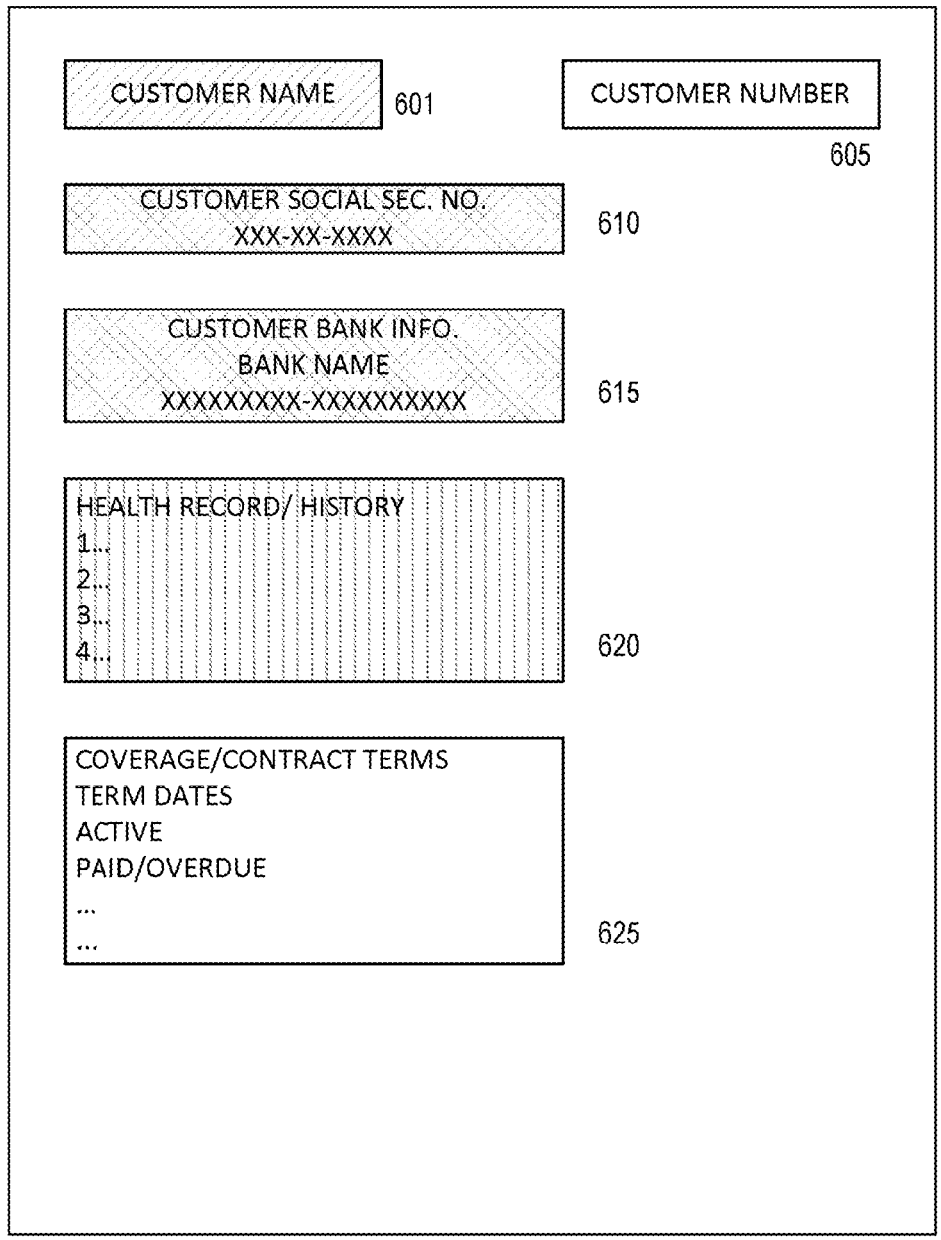
FIG. 6 illustrates an exemplary document file containing sensitive information recognized and encrypted according to aspects of the present disclosure.

Referring now to FIG. 6, an exemplary document file 600 containing sensitive information recognized and encrypted according to aspects of the present disclosure is depicted. In particular, the document 600 may include exemplary information that can be identified and classified in three different security levels. In the present exemplary document, a customer identification number 605 and general terms 625 may be included and determined to be unclassified and for anyone requesting them to gain access. A first level of security may include the customer name 601. This information may be redacted accordingly and viewed only when authenticated as disclosed. A second level of security may include social security information or tax payer's identification numbers 610 and bank account information 615. This second level will require more secure encryption which for which the corresponding encryption key may only be provided, for example, to authorized individuals in the finance department of the organization. Health records 620 which may be subject to government regulations may require even more secure encryption and correspond to the highest level of security, for example. These, for example, may be accessible only by designated human resources individuals.

The many features and advantages of the invention are apparent from the detailed specification, and thus, it is intended by the appended claims to cover all such features and advantages of the invention which fall within the true spirit and scope of the invention. Further, because numerous modifications and variations will readily occur to those skilled in the art, it is not desired to limit the invention to the exact construction and operation illustrated and described, and accordingly, all suitable modifications and equivalents may be resorted to, falling within the scope of the invention. For example, one of ordinary skill in the art will appreciate that the steps illustrated in the illustrative figures may be performed in other than the recited order, and that one or more steps illustrated may be optional in accordance with aspects of the embodiments.

The invention claimed is:

1. A method for managing a computer readable document file, the method comprising:
   accessing information relating to operations or structure of an organization;
   determining, by a host's cloud storage system, a first access permission level and a second access permission level, for granting access to a computer readable document file that is stored in a computer-readable digital media storage device that forms part of the host's cloud storage system;
   assigning each of a plurality of individuals, who have been granted access to the computer readable document file, the first permission level or the second permission level based on processing the information relating to operations or structure of the organization;
   identifying a first type of sensitive information in the computer readable document file by i) comparing the computer readable document file to a source document in which sensitive information has previously been identified and ii) identifying those parts of the computer readable document file that have the same keyword or context as parts of the source document, as having sensitive information;
   matching the first type of sensitive information with the first access permission level or the second access permission level;
   encrypting the identified first type of sensitive information; and
   transmitting an access key from the host's cloud storage system to a computing device of a selected individual of the plurality of individuals, the access key configured to provide the selected individual access to the encrypted first type of sensitive information in the file.

2. The method of claim 1, further comprising:
   identifying a second type of sensitive information in the computer readable document file;
   matching the second type of sensitive information in the computer readable document file with an access permission level not matched for the first type of sensitive information;
   encrypting the identified second type of sensitive information in the computer readable document file; and
   providing a second access key for the encrypted second type of sensitive information to individuals assigned with the matched access permission level for the second type of sensitive information.

3. The method of claim 2, further comprising redacting the first type of sensitive information and the second type of sensitive information when giving access to the computer readable document file to an individual who has not been given i) the access key for the encrypted first type of sensitive information in the file and ii) the second access key for the encrypted second type of sensitive information in the file.

4. The method of claim 3, further comprising:
segmenting the computer readable document file according to the encrypted first and second types of information.

5. The method of claim 3, further comprising:
duplicating data that excludes the identified first type and second type of sensitive information, into a new document.

6. The method of claim 1, wherein the identifying of the first type of sensitive information in the computer readable document file comprises using a pattern recognition algorithm.

7. The method of claim 1, wherein the identifying of the first type of sensitive information in the computer readable document file comprises using preprogrammed key-term identification.

8. The method of claim 1, wherein the identifying of the first type of sensitive information comprises using both pattern matching algorithms and preprogrammed key-term identification.

9. The method of claim 1 further comprising:
recording use of a provided access key, the recorded use includes one or more of access time and date, duration of document access, device's internet protocol address, device's serial number, network location, and user.

10. The method of claim 1 wherein the information relating to operations or structure of the organization identifies a plurality of business groups that make up the organization and to which the first permission level and the second permission level are assigned.

11. A cloud file management system comprising:
a cloud server including a controller, the controller comprises a computer processor in digital communication with a digital media storage device, wherein the digital media storage device stores software code that is executable upon demand and operative with the computer processor to
save a computer readable document file in a digital media storage database;
access information relating to operations or structure of an organization;
determine a first access permission level and a second access permission level, for granting access to the computer readable document file as stored in the digital media storage database;
assign each of a plurality of individuals, who have been granted access to the computer readable document file, the first permission level or the second permission level based on processing the information relating to operations or structure of the organization;
identify a first type of sensitive information in the computer readable document file by i) comparing the computer readable document file to a source document in which sensitive information has previously been identified and ii) identifying those parts of the computer readable document file that have the same keyword or context as parts of the source document, as having sensitive information;
match the first type of sensitive information with the first access permission level or the second access permission level;
encrypt the identified first type of sensitive information; and
provide an access key configured to provide a selected individual, of the plurality of individuals, access to the encrypted first type of sensitive information in the file, wherein a transmitter is to transmit the access key to a computing device of the selected individual.

12. The system of claim 11, wherein the cloud server is further configured to:
identify a second type of sensitive information in the computer readable document file;
match the second type of sensitive information in the computer readable document file with an access permission level not matched for the first type of sensitive information;
encrypt the identified second type of sensitive information in the computer readable document file; and
provide a second access key for the encrypted second type of sensitive information to individuals assigned with the matched access permission level for the second type of sensitive information.

13. The system of claim 12, wherein the cloud server is further configured to redact the first type of sensitive information and the second type of sensitive information when giving access to the computer readable document file to an individual who has not been given i) the access key for the encrypted first type of sensitive information in the file and ii) the second access key for the encrypted second type of sensitive information in the file.

14. The system of claim 13, wherein the cloud server is further configured to segment the computer readable document file according to the encrypted first and second types of information.

15. The system of claim 13, wherein the cloud server is further configured to duplicate data that excludes the identified first type and second type of sensitive information, into a new document.

16. The system of claim 11, wherein the cloud server identifies the first type of sensitive information in the computer readable document file using a pattern recognition algorithm.

17. The system of claim 11, wherein the cloud server identifies the first type of sensitive information in the computer readable document file using preprogrammed key-term identification.

18. The system of claim 11, wherein the cloud server identifies the first type of sensitive information using both pattern matching algorithms and preprogrammed key-term identification.

19. The system of claim 11 the cloud server is further configured to record use of a provided access key, the recorded use includes one or more of access time and date, duration of document access, device's internet protocol address, device's serial number, network location, and user.

20. The system of claim 11 wherein the information relating to operations or structure of the organization identifies a plurality of business groups that make up the organization and to which the first permission level and the second permission level are assigned.

* * * * *